Figure 1:
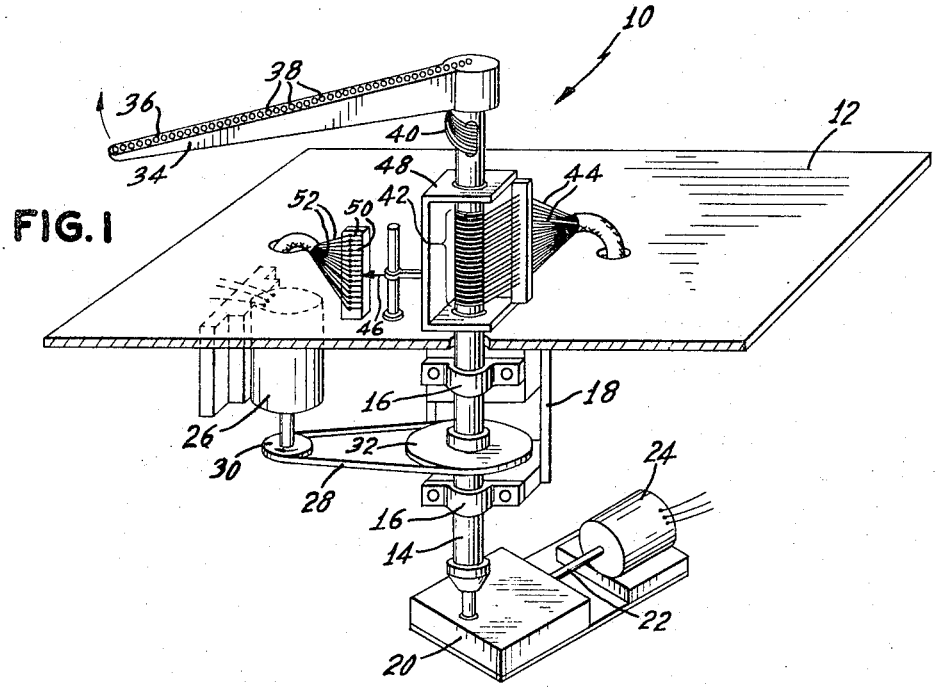

May 30, 1967 H. F. MALONE ET AL 3,323,126
TRUE SCALE THREE DIMENSIONAL DISPLAY DEVICE
Filed June 16, 1964 2 Sheets-Sheet 1

INVENTORS
Howard F. Malone
BY William R. Malone

ATTORNEY

INVENTORS
Howard F. Malone
William R. Malone
BY
Jerome Bauer
ATTORNEY

United States Patent Office 3,323,126
Patented May 30, 1967

1

3,323,126
TRUE SCALE THREE DIMENSIONAL DISPLAY
DEVICE
Howard F. Malone, 35 3rd Ave., Massapequa Park, N.Y.
11762, and William R. Malone, 21 Healy Ave., Inwood, N.Y. 10034
Filed June 16, 1964, Ser. No. 375,596
20 Claims. (Cl. 343—112)

This invention relates to a display device and, more particularly, to a three dimensional display device.

Although the present invention has application to the scale display of the relative position of objects in any kind of volume, the present invention may, perhaps, be best understood if related more directly to the problem of air traffic control. At the present time, complex and multiple systems incorporating a number of radar units are coordinated to provide specific information relating to the altitude, azimuth and range of an aircraft relative to a reference point at the airport. Thus, for example, during the control of air traffic about an airport, the control operator is provided information by a plurality of specialized radar units. The operator of each radar unit supplies the controller with his specific information. This information is then assembled by the controller and plotted on a series of plastic overlays which incorporate symbols that attempt to display to the controller the ever changing pattern of the aircraft flying relative to the fixed reference point of the airport. In some cases, the air traffic control operator receives the information directly from the radar operators and in his own mind, combines such information in an attempt to visualize the relative position of the aircraft over the airport.

Obviously, these methods are antiquated, inadequate and dangerous. They are subject to human frailties and errors. This is especially true during periods of poor visibility conditions when numerous aircraft are stacked one above the other for thousands of feet, circling in different quadrants of the airport, and maintaining their designated altitudes for extended periods while the air traffic control operator attempts to thread one of the aircraft down through the maze of the ever changing pattern of aircraft to a safe landing on the runway.

The systems employed heretofore do not provide the control operator with a true representation or picture of the area above and within a reasonable range of his airport. They do not enable the control operator to visually observe the position of each aircraft and its relationship to every other aircraft in the area of the airport. There is no way the operator can specifically concentrtae his attention upon a landing aircraft nor can he clearly see its position and that of others to enable him to properly and with assurance instruct the aircraft pilot how to avoid other aircraft in the vicinity. At present, there is nothing to show either the traffic control operator or the pilot how to approach his safe glide path at a distance well out beyond the airport and its landing runway, no less to enable them to see whether the craft is approaching the runway correctly and safely. Thus, both the pilot and his guiding operator actually "grope" and "feel" their way together hoping their cooperation will result in a safe landing. This has been a basic defect and problem. Prior systems have failed to provide the control operator with any true scale three dimensional representation of an imaginary glide path along which a landing aircraft should descend for safe landing contact with the runway. Accordingly, the present invention is directed to the correction of the aforementioned defects.

Hence, the desideratum of the invention is to provide a device that will present to an observer a display in true scale and in three dimension of the volume of space within a reasonable distance about him and the position of each and every object observed therein by known detecting mechanisms.

In carrying out the purpose of the invention, an object thereof is to provide a display device that will present a scaled visual representation of any object, its range or distance, its bearing or azimuth, and its height above or below a given reference within a selected volume.

Another object of the invention is the provision of a display device that may be utilized to present a display of one or more objects in any volume, whether air or water relative to a reference such as a vessel at or below sea level or relative to any reference point. In this connection, a further object of the invention resides in the ability to provide a display of an imaginary path along which it is desired that a vehicle travel and a portrayal of the movement of such vehicle in its travel with respect to such path.

Still another object of the invention is the provision of a display device that can be connected directly to existing radar systems to receive the information directly therefrom and provide a visual display of the objects normally portrayed thereon, eliminating the human error in assembling and interpreting the information of such radar systems.

A further object of the invention is to display, in scale and in three dimensions, the position of any number of objects within the field of the tracking radar and portray their positions relative to each other in space by illuminable display devices which may be color coded to provide the viewer with a continuing representation of the precise positions of the objects in space showing their range, bearing and height relative to a fixed reference.

Further objects and features of the invention reside in the novel arrangement of display elements that can be operated intermittently, yet present to the viewer a continuous representation of an object in true scale and in three dimensions and its corresponding position in space.

Figure 2:
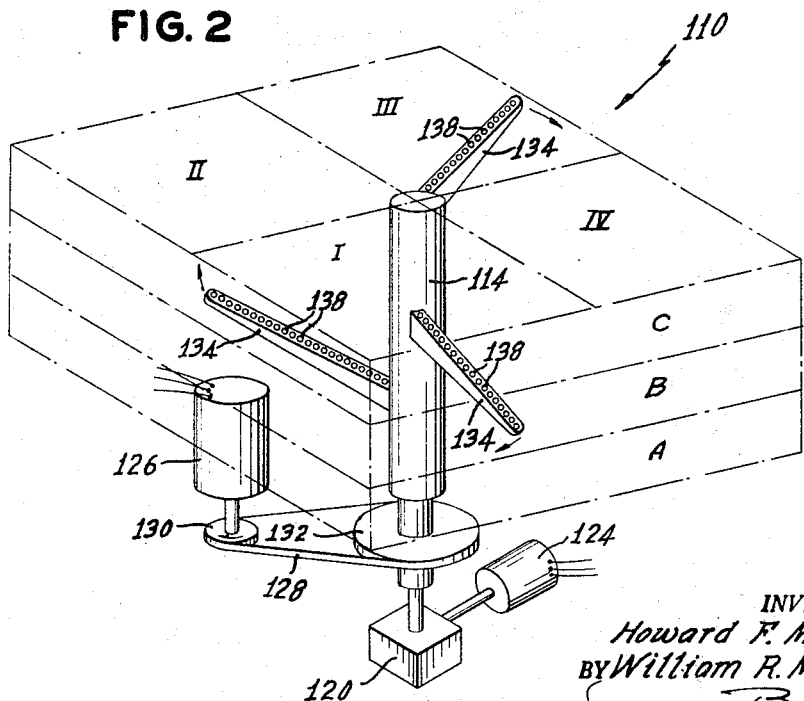
Figure 3:
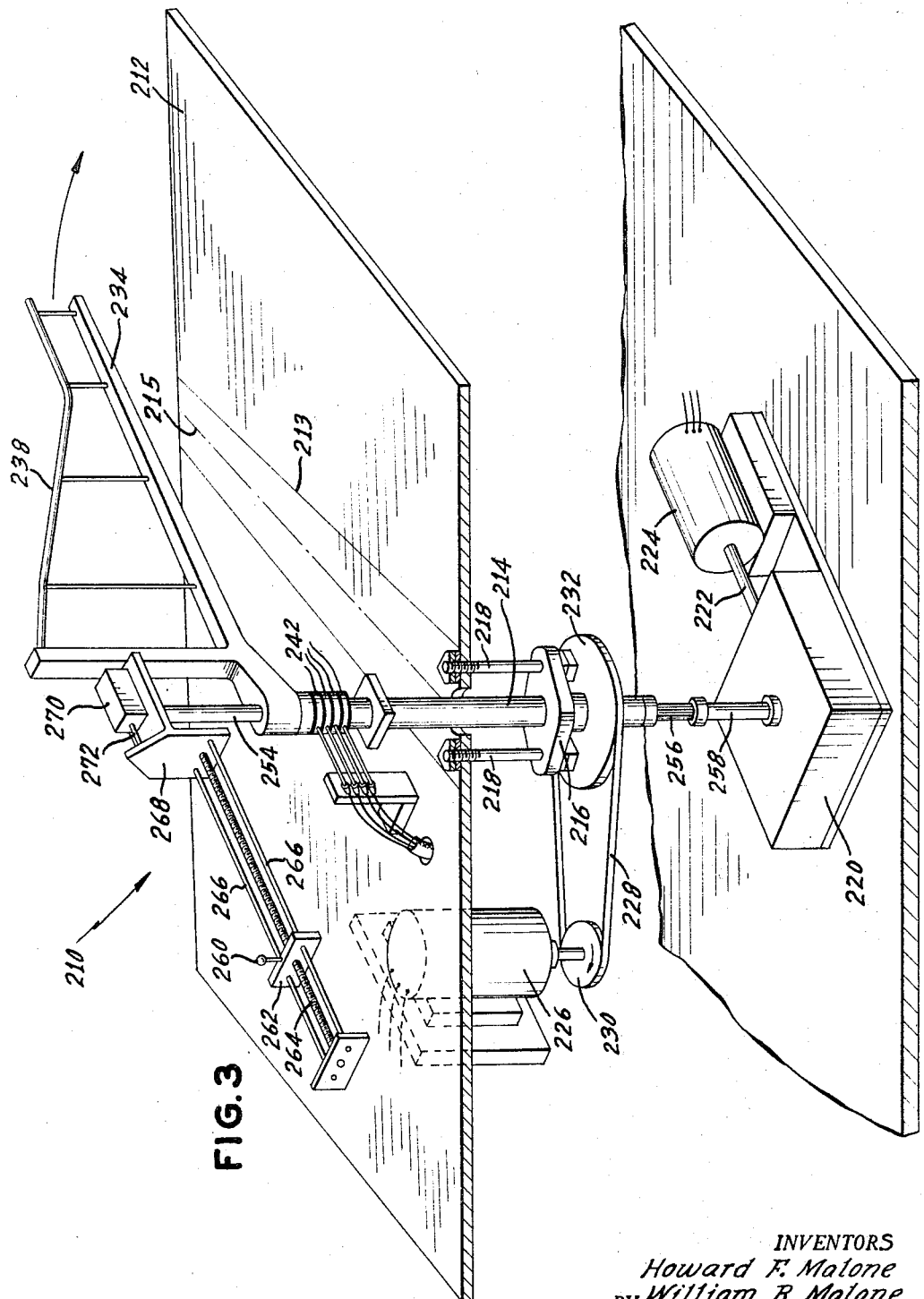

Other and further objects of this invention reside in the structures and arrangements hereinafter more fully described with reference to the accompanying drawings in which:

FIG. 1 is a partial diagrammatic view of a display device according to the teaching of the invention, FIG. 2 is a diagrammatic view of the display device of FIG. 1 illustrating an embodiment thereof, and FIG. 3 is a further embodiment of the display device according to the teaching of the invention.

Referring now to FIG. 1, the display device there shown is generally identified by the numeral 10. In order that the aspects of the invention may be more clearly understood and to enable a simple description of its operative details without limiting the scope of the invention, a surface 12 is provided as a reference plane. As the description proceeds, it will be recognized that the plane surface 12 is utilized in the description solely as a plane of reference. The surface 12 need not be provided in the actual operation of the invention. However, if the display device 10 is to be utilized in connection with air traffic control over an airport, the surface 12 may be likened to the ground surface of the airport, thus providing the reader with an understandable reference.

Extending upward through the surface 12 is a rotatable shaft member 14. The shaft 14 is mounted in spaced bearing straps 16 secured to a support 18. The lower end of the shaft 14 extends into a housing 20 that contains a servo-elevator mechanism of any conventional design. For this reason, the details of such servo-elevator mechanism contained within the housing 20 are not illustrated. However, the elevating mechanism in the housing 20 may comprise a gear train connected with a drive shaft 22 that is driven by a motor 24. The operation of the motor 24 causes the drive shaft 22 to rotate and thereby operate the servo-elevator mechanism gear train within the housing 20 to cause the shaft member 14 to move axially so as to raise or lower along its axis relative to the bearing straps 16 and to the plane surface 12. During the axial raising or lowering of the shaft member 14, the same is rotated by the operation of a motor 26 connected by means of a belt 28 across the motor pulley 30 and pulley 32 mounted on the shaft 14.

Forming an integral part of, and fixed to the shaft 14 for simultaneous rotation therewith, is a sweep member or arm 34. The sweep member or arm 34 has an upper surface 36 that rotates through an angle of at least 360°. The arm 34 and its planar surface 36 are directed radially from the axis of rotation of the shaft 14. In the present disclosure, the shaft 14 is illustrated in a vertical position only because it is here disclosed for use as an airport surveillance device. Where the device 10 is used for other purposes, as in a submarine, the shaft 14 may rotate at any angle. For convenience, the arm 34 is positioned perpendicularly to the shaft and operates in a plane perpendicular to the axis of the rotation of the shaft.

The arm 34 may be of appropriate extent or length to simulate, in true scale, any desired distance or range to be displayed from the center or axis of rotation of the shaft 14. Positioned on and for coincidental rotation with the planar surface 36 of the arm 34 is a display means here shown in the form of a plurality of radially aligned illuminable or glow discharge lamps 38. The display means 38 extend from the reference point or axis of rotation of the shaft 14 to the end of the arm 34. Each display lamp 38 is connected by an electrical connector or wire 40 to a respective one of a plurality of slip rings 42 mounted for rotation with the shaft 14. Each slip ring 42, being of a conductive material, is engaged by a respective one of a plurality of connectors 44. Each slip ring 42 is provided with a reference point about its periphery. This enables all of the slip rings to be oriented about the shaft 14 so their reference points may be aligned with each other and may be referenced at zero degrees azimuth for proper synchronous operation with an azimuth radar signal source.

In the embodiment of FIG. 1, the connectors 44 are shown to extend downward through and beneath the planar surface 12. This showing is made for illustrative purposes only. In actual practice, each one of the connectors 44 is adapted to receive electrical impulses generated by a keying or pulse unit which is controlled by signals provided by any well known translator device interposed between the display device 10 and a standard radar output system adapted to track an object in a selected volume in space. The impulses provided to the connectors 44 will occur during the rotation of the shaft 14 and will be keyed to a specific one of the connectors 44 that operates one of the display lamps 38 along a portion of the arms 34 to display, in scale, the range or distance that the object being tracked is positioned from a given reference point. This impulse will be provided momentarily to the proper connector 44 during the precise period of angular rotation of the shaft 14 and at the time the sweep member or arm 34 passes through the angle or azimuth heading corresponding to the position of the object in space relative to a given reference point.

Thus, upon the operation of the range tracking radar system or unit, one of the plurality of connectors 44 will be energized to complete a circuit to its respective slip ring 42. The range tracking system is connected in an electrical circuit with a height or altitude switch contact 46. The switch contact 46 is fixed for axial movement with a housing 48 that encompasses the slip rings 42. The altitude switch contact 46 completes a circuit interposed between the azimuth impulse generator of the range tracking radar (not shown) and the slip rings 42 and the display means or illuminable lamps 38. The contact 46 is adapted to move with the housing 48 that is fixed for axial movement with the shaft 14. Consequently, as the shaft 14 is moved along its axis, the switch contact 46 moves with it and alternately engages a plurality of altitude conductors 50. Each one of the altitude conductors 50 is connected by a respective one of a plurality of wires 52 to a conventional combined altitude-azimuth correlating unit to receive electrical impulses therefrom. When so connected, the altitude unit supplies a signal to one of the plurality of wires 52 to energize a respective one of the conductors 50. Hence, as the shaft 14 is rotated by the motor 26 and is moved up and down along its axis by the motor 24, the altitude switch contact 46 alternately moves up and down into engagement with respective ones of the plurality of altitude conductors 50. When the switch contact 46 moves into engagement with the specific altitude conductor 50 energized by a combined altitude-range correlating unit, a circuit is completed therewith.

During operation, the shaft 14 is continuously rotated through complete revolutions of at least 360° by the motor 26 and the connected pulleys and belt 28, 30 and 32 while the sweep member or arm 34 rotates in a plane perpendicular to the axis of rotation of the shaft. The display means or operable lamps 38 describe a helical arc through an azimuth of 360° because as the shaft 14 rotates, it is also being continuously reciprocated axially by the mechanism in housing 20. During its rotation, the display means 38 is capable of indicating or displaying the position of any object picked up or tracked by radar within a specific volume. Being a true scale reproduction of a specific volume of space about the axis of rotation of the shaft 14, the display device 10 provides a true scale three dimensional representation of the corresponding position of any object in such volume of space relative to the axis of the shaft 14.

While the shaft 14 and display means 38 are rotating and reciprocating information as to the range or distance, azimuth and altitude of an object is transmitted in the form of an electrical impulse to the respective one of the connectors 44 and conductors 50. Therefore, if at the precise point in the angular rotation of the shaft 14 the display means 38 passes through the angle corresponding to the azimuth position or heading of the object being tracked in space, it is also positioned at the proper height along its axial movement so that its altitude switch contact 46 completes a circuit with the energized altitude conductor 50, the appropriate display lamp 38 will be operated at the portion along arm 34 to indicate the range of the object.

In practice, the shaft 14 is rotated at a relatively high speed while its axial or reciprocating speed of movement is lower. For example, the rate of rotation of shaft 14 may be in the order of approximately 1800 revolutions per minute while a complete axial cycle or excursion of movement up and down may be performed within a period of one second. In this manner, the display means 38 will describe a helical path during its ascent and descent. During both up and down directions of travel, there will be a display of information, thereby resulting in a doubling of the display of the corresponding objects in space.

It will be clear that the subject volume of space is continuously being scanned by the radar and unendingly displayed by the device 10. The unending rotation and axial movement of the display means 38 through the scale size volume insures that all objects detected in the corresponding volume of space will be intercepted and displayed. Those skilled in the art will recognize that the display means 38 here disclosed in the form of operable illuminable lamps should not be so limited since other forms of displays may be utilized. However, in practice, the use of lamps has proved well suited for the intended purpose of this invention.

When the display means 38 is coincident in height and angular rotation with the altitude and bearing of the object in space, the same will operate to display the range position of that object along a portion of its length corresponding to the distance of the object from a given reference point. However, the controlling electrical impulses will be of such short duration that the fired display lamp 38 will have an illumination of short duration and merely produce a glow or flash of light that appears suspended or unsupported in space. The rotary motion of the support arm 34 is so rapid that it is not perceived. Yet, during the operation of the device 10 through one complete cycle of up and down movement of the shaft 14, because of the rapid speed of rotation a plurality of objects may be displayed as separate continuous illuminations suspended in space. This results in a three dimensional showing of the positions of the objects relative to each other and to the fixed reference axis of the shaft 14.

Recognizably, as objects move through space and are detected by the appropriate radar units, their relative positions will be displayed in three dimensional scale by the display device 10. When the altitudes, bearings and ranges of the objects become more and more coincident with each other, the illuminating flashes of the display means 38 move closer together and become more closely spaced. Objects at equal altitudes will be displayed simultaneously while objects at closely spaced different altitudes are seen at closely spaced intervals of time during the up and down scanning movement of the display means 38. Objects at widely spaced altitudes are so displayed and appear at less coincident intervals of time.

A complete cycle or excursion of the display means 38 up and down and through a series of complete helical arcs may be made to any scale to represent a corresponding volume of space. Thus, if the present invention is employed as a surveillance system for the volume of space above an airport, the complete height of vertical movement of the shaft 14 may be any number of inches with each inch representing any number of feet of altitude. Obviously, the height of movement of the shaft 14 can be varied to suit particular requirements of operation. Similarly, the length of the arm 34 and display means 38 may be scaled to represent any distance from a given reference point.

The display device 10 has unlimited application. It may be employed not only for use on land, but also as a display in the cockpit of an aircraft as an adjunct to the standard radar equipment therein. It may also be utilized in submarines for surveillance of objects detected in a volume of water about such vessels. It is not limited to the use of a single sweeping display means 38 and support arm 34 disclosed in FIG. 1. In practice, the rotatable shaft 14 has been balanced by adding to it a plurality of such display means and support arms. This is exemplified by the diagrammatic showing of a modification of the display device generally identified in FIG. 2 by the numeral 110.

The display device 110 operates on the same principle and in the same manner as the display device 10. For this reason, the display device 110 of FIG. 2 shows only sufficient parts of the previously described display device 10 to enable a clear understanding of its applications. The similar details shown in the display device 110 corresponding to those of the display device 10 are identified by numbers in the 100 series.

Display device 110 includes a shaft 114 that is rotatable at relatively high speeds by the motor 126 by way of the belt 128 and pulleys 130 and 132. The rotatable shaft 114 is moved along its axis by a servo-mechanism enclosed in a housing 120 and operated by a motor 124. Rotatable and reciprocable with the shaft 114 are a plurality of display means 138 each supported by a support or sweep arm 134. As in the device 10, the display means 138 may be in the form of individually aligned lamps each operable separately by an electrical impulse in the manner as previously described.

Where a plurality of sets of display means 138 are provided as in FIG. 2, they are evenly distributed or spaced about the shaft 114 to balance the same. Although only three such display means 138 and support arms 134 ars shown in FIG. 2, it should be clear that this should constitute no limitation since any number can be used. However, in this arrangement, it is good practice to space or stagger the display means 138 and their arms 134 at equal angular distances about the shaft 114 and at different heights from each other.

The use of multiple display means 138 as in FIG. 2 increases the depth of field of the device 110. That is to say, each display means 138 and its support arm 134 may be spaced from the other axially along the shaft 114 a distance equal to the actual height of reciprocation of the shaft. Consequently, it is possible to reduce the height of reciprocation of the shaft 14 of the display device 10 by one third by simply adding two more display elements or members 138 as shown in FIG. 2. This also results in a more rapid display of the detected objects by the device 110.

The display device 110 may be applied to general airport surveillance in the manner shown in FIG. 2, within the air space about the invention as shown in dot-dash lines. The center or axis of rotation of the shaft 114 corresponds to a reference point at the airport from which the surveillance is conducted. The air space is shown divided into four quadrants I, II, III and IV that intersect as the axis of the shaft 114. This division into quadrants corresponds to the quadrant stacking and dispersal of aircraft above an airport as usually occurs during poor weather conditions. The altitude of the volume of space is divided into heights or levels A, B and C.

In the operation of the display device 110, each display element 138 is designated to display objects within that specific altitude within which it rotates and reciprocates. In FIG. 2, the lowermost display means 138 will display objects in all quadrants in its corresponding lowermost altitude level A. The middle and topmost display means 138 will correspondingly display objects in their respective levels B and C. This results in a more rapid survey of each level of altitude providing the observer with a complete three dimensional scale representation of all objects in the space being surveyed by the tracking radar or other detecting units.

As in the embodiment 10, the shaft 114 will be continually rotated while reciprocated by the servo-elevator mechanism in the housing 120. This causes each of the support arms 134 to execute an unending series of helical movements each restricted to their own level of altitude. Thus, as each arm and its display means 138 moves coincident with the angular bearing and altitude of an object detected by the connected radar, an operating electrical impulse is supplied thereto. This rapidly selectively operates and fires the correct one of the illuminable lamps along the portion of the length of the display means 138 corresponding to the distance of the object in space from the reference point at which the radar is functioning. The use of the three arms 134 and their corresponding display means 138 enables a more rapid, and at times, a simultaneous display of objects in the same or different levels of altitude.

In the arrangements 110, it has been found practicable to provide each support arm 134 with display means of different colors. This color coding of levels of surveillance provides the observer with an immediate picture and visual representation of the sampled volume of space enabling him to observe the changes in color of the display of objects as the objects move from one level of altitude to another. In both display devices 10 and 110, the display means 138 may also have different colors along portions of their lengths to immediately show at what distance the displayed object is from the given reference point on any airport.

The display device 110 has many possible adaptations. It may be utilized not only for surveillance as described in the embodiments 10 and 110, but also for the purpose of tracking the movement of a vehicle through a volume of space to determine whether it is moving relative to a path along which it is desired such vehicle proceed. It is immaterial whether the volume of space be water or air. In this respect, it is sometimes desirable to be able to track the movement of a vehicle such as a rocket or a torpedo, to determine whether the same is proceeding along a desired path. The same is also true in its application to more immediately recognized problems in the field of tracking landing aircraft during poor visibility or inclement weather conditions. The present invention enables this to be accomplished by the use of a display device embodiment generally identified by the numeral 210 shown in FIG. 3.

The display device 210 incorporates the basic concepts of the display device 10 previously described. In this respect, a surface or reference plane 212 may be utilized to provide the air traffic control operator with a visual representation of the physical appearance of the airport and the specific location of its landing runways, as the landing runway 213 illustrates. Extending upward through the surface 212 is a main shaft 214. The main shaft is supported for rotation by a suitable support bearing 216 bolted at 218 to the underside of the surface 212. The main shaft 214 is rotated about its axis by a motor 226 having a pulley 230 that is engaged by a belt 228. The belt 228 engages with a pulley 232 secured to the main shaft 214 to rotate the same.

Fixed to the top of the main shaft 214 is a support arm or sweep member 234. The support arm 234 is perpendicularly disposed with respect to the axis of rotation of the main shaft 214 and, therefore, rotates in a plane that is perpendicular to the axis of rotation of the shaft. Mounted on and supported by the arm 234 is a display means 238. Here again, the display means 238 may be of any desired material. However, it has been found that a glow discharge tube may be used and fashioned to the shape of an imaginary glide path along which it is desired a landing aircraft proceed to make a safe and proper landing on the runway 213. The display means 238, therefore, is secured to the arm 234 and rotates with the main shaft 214 while describing an arc of rotation of at least 360°.

Mounted within and for synchronous rotation with the main shaft 214 is a secondary shaft 254. The shaft 254 is keyed or splined as at 256 to the main shaft 214 for simultaneous rotation therewith. Thus, rotation of the shaft 214 will also cause the synchronous rotation of the shaft 254 and its associated details of structure. The lower end of the shaft 254 is bearingly mounted at 258 to extend downward into a housing 220 for engagement with a servo-elevator mechanism of the type previously described in connection with the embodiment 10 for the purpose of moving the secondary shaft 254 up and down cyclically along its axis of rotation. As before, the details of the servo-elevator mechanism contained in the housing 220 form no part of the present invention and may be of any conventional design.

The same may be operated by a motor 224 having a drive shaft 222 except, however, that because the present embodiment will be disclosed as limited to the tracking of a single aircraft involved in a landing problem, it is unnecessary to cause the shaft 254 or the display means 260 to execute continuous helical paths. Rather, it is only necessary that electrical impulses be imparted to the motor 224 to cause the same to drive the servo-elevator mechanism in the housing 220 to raise or lower the shaft 254 and display means 260 to the altitude of the object or aircraft being tracked. Hence, although the shaft 254 and display means 260 may be caused to execute unending cycles of helical paths, it is not necessary in the present embodiment 210.

Mounted for rotation with the secondary shaft 254 is a vehicle position display means 260. For ease of understanding, the description of the display device 210 illustrated in FIG. 3 will be specifically restricted in disclosure to an aircraft tracking system to be utilized by an air traffic control operator at an airport to enable him to actually see and guide an aircraft for a blind landing on a runway of the airport. This restriction of the disclosure of FIG. 3 is done solely for the purpose of providing the reader with a frame of reference that is perhaps more commonly understood. It does not, however, constitute a limitation upon the scope of the invention. In consequence, the vehicle position display means 260 is intended to display an object such as an aircraft proceeding to a safe landing on the runway 213 of the airport 212. The display means 260 may take the form of an operative illuminable glow discharge lamp or other conventional display means.

The display means 260 is mounted on a support structure affixed to the secondary shaft 254 to enable its radial movement toward and away from the axis of rotation of the shaft. This enables it to continuously display the range or distance of the aircraft from the center or axis of rotation of the shaft 254, which axis may correspond to a given reference point on or in relation to the corresponding airport 212 and the landing runway 213. The movement of the aircraft display means 260 is accomplished by mounting the same on a plate 262 that is provided with an internal thread adapted to be engaged with an elongated screw 264. The plate 262 is guided for movement along the length of the screw 264 by rods 266 extending therethrough. The actuating screw 264 and guide rods 266 are mounted at their radial inner ends on a bracket 268 that is mounted to the shaft 254. A servo-motor 270 is mounted on an arm of the bracket 268 and includes a drive shaft 272. Although not illustrated in FIG. 3 of the drawing, the drive shaft 272 is gear connected by any conventional mechanism to the actuating screw 264 to rotate the same in reversible directions.

The display device 210 is adapted to be connected in circuit with a translator unit that is adapted to transmit electrical impulses thereto received from appropriate tracking radar units or other conventional detection devices used for the tracking of landing aircraft. The display device 210 may function as a true scale three dimensional display of the information received on each of the tracking radar units. It provides a true visual display, in depth, of such information so the air traffic control operator may clearly see the landing aircraft, the glide path it must follow to execute a safe approach and landing, and to direct the same all during this maneuvering until the actual touchdown of the aircraft on the runway 213.

Thus, in the present embodiment, as in the prior described embodiments, the display device 210 receives electrical impulses from the translator of the tracking radar units. These impulses are received by the display device 210 at a plurality of slip rings 242. The slip rings may be provided with a reference mark thereon to enable them to be rotated or oriented on the main shaft 214 to align the receiving impulses so they are coincident in angular relation or azimuth with the particular runway 213 then in operation.

The glide path display means 238 is connected with one of the slip rings 242 to receive an electrical impulse therefrom precisely during such period of angular rotation when the same is in alignment with the center 215 of the landing runway 213. The electrical impulse transmitted to the proper slip ring 242 connected with the display means 238 will momentarily operate the same to illuminate it along its length. This displays the guide path along which it is desired an aircraft proceed for a proper and safe approach, touchdown and landing on the runway 213.

Another of the slip rings 242 is connected with the servo-motor 270 to operate the same in accordance with electrical impulses received from the radar units. The rotation of the servo-motor 270 correspondingly rotates the actuator screw 264 to position the aircraft position display means 260 along the length thereof, thereby providing an indication of the distance or range of the aircraft relative to the desired glide path. The aircraft position display means 260 is also connected by a conductor (not shown) with another of the slip rings 242 to receive operating impulses therefrom for operation of the same in accordance with the information supplied by the radar tracking units.

The operation of the embodiment of the display device 210 is substantially the same as that of the previous embodiments heretofore described. The main shaft 214 is rotated at a relatively high speed of rotation by the motor 226. During this period of rotation, the glide path display means 238 is periodically operated and illuminated each time its path of movement becomes coincident with that of the center line 215 of the landing runway 213. In the drawing, the approach of the glide path display means 238 has been positioned proximate the axis of rotation of the shaft 214 whereas the touchdown or low point of the glide path display means 238 has been positioned remote from the axis of rotation of the shaft. It is possible in practice to reverse the position display of the glide path display means 238. However, the arrangement here shown suffices for the purpose of providing a complete understanding of this embodiment of the invention.

As the main shaft 214 and the glide path display means 238 rotate and as the glide path display means 238 is operated to illuminate periodically during its movement over and coincident with the center line of the landing runway 213, the aircraft position display means 260 also rotates synchronously therewith. However, its shaft 254 is reciprocated along its axis of rotation to coincide with the altitude of the aircraft being tracked by the operation of the motor 224 and the servo-elevator mechanism contained in the housing 220. During this time, impulses received by the motor 270 position the display means 260 at the proper position along the length of the screw drive 264. Therefore, as the display means 260 is reciprocated to the altitude and positioned at the range or distance of the aircraft relative to the runway 213, it is operated by an impulse signal provided to the proper slip ring 242 to illuminate as it moves through the angular bearing or azimuth heading of the aircraft being tracked in space. Thus, the display device 210 may be utilized to track a landing aircraft from a position well beyond the glide path 238 of the landing runway 213 and to enable the control operator constantly to observe the position of such landing aircraft as it approaches the glide path 238. The control operator can now actually see the position of the aircraft and instruct the pilot how to guide the same down precisely along the desired glide path to a safe and proper touchdown with the surface of the runway 213.

It has been found that if the glide path display means 238 has a specific illuminating color and the aircraft display means is of a different illuminating color, the operator will more clearly perceive and can more accurately visualize the approach of the aircraft to and along the glide path. Although each display means 238 and 260 is operated to flash at spaced intervals, their synchronous speed of rotation is such that the flashes appear as continuous illuminations that are suspended or hang in space. Thus, while the glide path display means 238 appears as a line fixed in space, the aircraft display means 260 moves relative to it. If the colors of the display means 238 and 260 are complementary, as the aircraft position moves into coincidence with the glide path, their lights or colors merge and a resultant color combination is more readily preceived by the operator. This enables him to recognize immediately that the aircraft is coincident with the glide path. Accordingly, the operator may instruct the landing pilot precisely how to maneuver his craft so as to bring the same coincident with the glide path and to result in a safe touchdown of such vehicle on the runway.

As noted previously, the embodiment 210 of the display device need not be limited to the application of tracking and guiding an aircraft to a safe landing along a desired glide path. Other applications are foreseeable. For example, it is possible that the glide path display means 238 here disclosed may actually depict a desired flight path for a rocket vehicle. In such case, the display means 238 may be positioned vertically and may be shaped to display the desired flight path of the rocket or other moving vehicle. In like manner, the display device 210 may be utilized also for tracking undersea objects. It will be recognized that the display means 260 and its operating structure 264, 266, 270 and 272 may be applied to the display device embodiments 10 and 110 previously described. In like manner, the string of display illuminating means 38 and 138 of the previously described embodiments may be substituted herein for the movable display means 260. However, whichever display means are employed, the results still will be the same. Thus, although specific display means are taught, variations thereof are envisioned without deviating from the scope of the invention.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

We claim:

1. A display device comprising a member rotatable about an axis and movable therealong, means to rotate and move said member along its axis, display means extending from the axis of rotation of said member and operable to display a portion along the extent of said member, and means to operate said display means 2. A device for displaying in scale and in three dimensions the position of an object corresponding to its position in space comprising a radially directed arm having an axis of rotation, means to rotate said arm, means connected with said arm to move the same vertically along its axis of rotation, said arm including display means operable along a portion of the length thereof to display the range, azimuth and vertical position of an object corresponding to its position in space.

3. A device for displaying in scale the position of an object corresponding to its position in space relative to a given reference point comprising means operable to display the relative position of an object to the given reference point, a sweep member rotatable about an axis corresponding to the given reference point, said sweep member including said operable display means, means to rotate said sweep member through an angle of 360° and to move said sweep member along its axis of rotation through various planes, and means to operate said display means along a portion of said sweep member to display the position of the object and its corresponding position in space relative to the given reference point as the sweep member moves to the corresponding angular position and plane corresponding to that of the object in space.

4. A device for displaying the position of an object relative to a given point in space comprising a plurality of members each rotatable in a plane perpendicular to an axis passing through a point corresponding to the given point in space, operable display means rotatable with each of said members in their respective planes to display the relative positions of the object and the given point, means to rotate said members, means to move at least one of said members along its axis to a plane corresponding to that of the object to be displayed, and means to operate said display means of said one member to display the position of the object corresponding to its position in space relative to the given point when said one member rotates to the corresponding angular and planar position corresponding to that of the object in space relative to the given point.

5. A device to display the relationship of a moving vehicle in space relative to a path along which it is desired the vehicle move comprising a first operable display means to display a line simulating a path along which it is desired the vehicle in space move, a second operable means to display the position of the vehicle during its movement in space, means to rotate said first and second display means, means to move said second display means along its axis of rotation, and means connected with said first and second display means to operate the same to display the position of the vehicle in space and the path along which it is desired the same move.

6. A display device comprising a first rotatable display means, a second rotatable display means, said first and second display means being rotatable about a common axis, means connected with said first display means to operate the same to display the position of a first object, said second display means being operable to display the position of a second object, means connected with said second display means to move the same to different planes of rotation, and means connected with said second display means to operate the same to display the range, azimuth and planar position of the second object relative to the first object.

7. An aircraft tracking and display device comprising a plurality of rotatable members, means rotating said members about a common axis, means operable on one of said members to display an imaginary desired flight path for an aricraft, means to operate said flight path display means once each revolution of said one member, means operable on another of said plurality of rotatable members to display the position of the aircraft relative to the display of the imaginary flight path, means to move said other of said members vertically along its axis of rotation to a plane corresponding to the altitude position of the aircraft, and means to operate said aircraft display means at a position along said other member corresponding to the distance of the aircraft relative to the display of the imaginary flight path as said other member rotates to the angle corresponding to the azimuth position of the aircraft relative to the desired landing flight path and when said other member is in the plane corresponding to the altitude position of the aircraft.

8. An aircraft landing tracking and display device as in claim 7, said display means being illuminable lamps, and said means rotating said members about their common axis at a speed such that intermittent operation of the illuminable lamps once during each revolution of said members displays substantially continuous illuminations in space.

9. An aircraft tracking and landing display device comprising an operable illuminable glide path indicator means rotatable in a fixed plane, an illuminable aircraft indicator means rotatable in a plane about a common axis with said glide path indicator means, means connected with said aircraft indicator means to vary its plane of rotation vertically with respect to the glide path indicator means to a position relative thereto corresponding to the altitude of an aircraft being tracked in space, means to intermittently operate said illuminable glide path indicator means once during each revolution of rotation to visually display an imaginary aircraft glide path for an airport landing runway, means to intermittently operate said aircraft indicator means at a portion thereof corresponding to the position of an aircraft being tracked relative to the imaginary aircraft glide path as the same moves to the vertical plane and angular position in space corresponding to that of the aircraft being tracked, and means to rotate said illuminable glide path indicator means and aircraft indicator means synchronously at a speed to present a display of the intermittent operation of said indicator means as continuous illuminations in space.

10. A device as in claim 9, said illuminable aircraft indicator means including a plurality of lamps each separately operable to illuminate.

11. An aircraft tracking and display device comprising a first rotatable arm extending radially from its axis of rotation in a horizontal plane, a second rotating arm extending radially from its axis of rotation in a horizontal plane, said first and second arms each having a common axis of rotation, said second arm being movable vertically along the axis of rotation, a lamp shaped to display a desired landing glide path for an aircraft being tracked, said lamp being mounted on said first arm for rotation therewith, means connected with said lamp to illuminate the same once during each revolution of said first arm to display the desired landing glide path in space, an aircraft display lamp on said second arm, means mounting said aircraft display lamp for movement with said second arm and relative thereto along the extent thereof to a position from the axis of rotation of said second arm corresponding to the distance of an aircraft in space relative to the desired landing glide path, means to illuminate said aircraft display lamp when the same is positioned along the extent of said second arm a distance corresponding to the distance of the aircraft being tracked in space relative to the desired landing glide path and when said second arm is moved to a position corresponding to the altitude and angular bearing of the aircraft being tracked, and means to rotate said arms at a speed to display the intermittent illuminations of said lamps as continuous illuminations in space.

12. A display device comprising a plurality of arms rotatable about a common axis, means connected with said arms to rotate the same, means connected with said arms to move the same along their common axis of rotation, operative display means on each of said arms for movement therewith, and means to selectively operate said display means on each of said arms.

13. A display device as in claim 12, said arms being spaced from each other along said common axis.

14. A display device as in claim 12, said arms being spaced from each other along said common axis and angularly spaced from each other.

15. A display device as in claim 12, said arms being angularly spaced from each other.

16. A display device comprising a plurality of rotatable arms, means connected with said arms to rotate the same about and move the same along an axis, selectively operable display means on said arms for rotation and axial movement therewith, and means to selectively operate said display means during selected periods of their rotation.

17. A device for displaying the scaled position of an object corresponding to its position in a given volume relative to a reference point, said device comprising means operable to display the relative position of an object to the reference point, a member movable about an axis corresponding to the reference point, said member supporting said operable display means, means to move said member about the axis, means on said member to move said display means to selected distances from and to selected planes along said axis, and means to operate said display means along a portion of said member during the movement thereof to display the position of the object in its corresponding position in the volume relative to the reference point as the member moves to a position relative to the axis corresponding to the position of the object in the volume.

18. A display device comprising a plurality of operable display means, means to move said plurality of display means about a reference point, means connected with each of said display means to move the same toward and away from said reference point, and means connected with each of said display means to operate the same selectively during periods of their movement.

19. A display device as in claim 18, and means connected with at least one of said display means to move the same to different planes with respect to said reference point.

20. A device to display the relative positions of objects moving in a volume comprising a first operable display means to display the position of a first object moving in a volume, a second operable display means to display the position of a second object moving in a volume, means connected with said first and second display means to move the same about a common axis, means connected with said first and second display means to move the same to different planes relative to said common axis and to different distances from said common axis, and means connected with said first and second display means to operate the same to display the relative positions of first and second objects respectively moving in a volume.

References Cited
UNITED STATES PATENTS

| | | | |
|---|---|---|---|
| 1,535,437 | 4/1925 | Overton | 40—33 |
| 2,792,989 | 5/1957 | Luck. | |
| 3,079,585 | 2/1963 | Perry et al. | 343—7.9 X |
| 3,097,261 | 7/1963 | Schipper et al. | 343—7.9 X |
| 3,154,636 | 10/1964 | Schwertz | 178—6.5 |

FOREIGN PATENTS

| | | |
|---|---|---|
| 724,604 | 8/1942 | Germany. |

RODNEY D. BENNETT, *Primary Examiner.*

CHESTER L. JUSTUS, *Examiner.*

R. E. BERGER, *Assistant Examiner.*